United States Patent [19]

Weiss et al.

[11] 4,239,435
[45] Dec. 16, 1980

[54] APPARATUS AND METHOD FOR ASSEMBLYING RANDOMLY ARRANGED ARTICLES

[75] Inventors: Donald J. Weiss, Berkeley Heights; Bernard S. Speckhart, Short Hills, both of N.J.

[73] Assignee: White Machine Company, Inc., Kenilworth, N.J.

[21] Appl. No.: 39,672

[22] Filed: May 16, 1979

[51] Int. Cl.³ ............................................. B65G 47/50
[52] U.S. Cl. .................................... 414/136; 104/88; 209/937; 209/942; 414/134
[58] Field of Search .......................... 414/13, 134, 136; 198/680; 209/3.3, 559, 562, 563, 564, 937, 942; 104/88

[56] References Cited

U.S. PATENT DOCUMENTS

| | | |
|---|---|---|
| 1,217,986 | 3/1917 | Parce . |
| 1,217,987 | 3/1917 | Parce . |
| 1,217,988 | 3/1917 | Parce . |
| 1,247,535 | 11/1917 | Huddleston . |
| 1,412,631 | 4/1922 | Righter . |
| 1,597,527 | 8/1926 | Lane . |
| 1,808,405 | 6/1931 | Hurd . |
| 1,808,406 | 6/1931 | Gammell . |
| 1,813,229 | 7/1931 | Constable . |
| 1,816,331 | 7/1931 | Kruschwitz . |
| 1,823,773 | 9/1931 | Troy . |
| 1,902,088 | 3/1933 | Maurer . |
| 2,000,404 | 5/1935 | Maul . |
| 2,362,683 | 11/1944 | Weinberg . |
| 2,751,091 | 6/1956 | Freeman ............................ 414/136 |
| 2,989,181 | 6/1961 | Dickinson . |
| 2,993,595 | 7/1961 | Dickinson et al. . |
| 2,998,136 | 8/1961 | Gerisch . |
| 3,017,025 | 1/1962 | Stephen . |
| 3,075,653 | 1/1963 | Wales et al. . |
| 3,151,730 | 10/1964 | Bünten ............................ 414/134 X |
| 3,152,682 | 10/1964 | Rutkovsky et al. ............. 198/680 X |
| 3,442,950 | 1/1969 | Bachmann ............................ 198/680 |
| 3,550,751 | 12/1970 | Jack, Jr. . |
| 3,557,935 | 1/1971 | Gerisch . |
| 3,564,271 | 2/1971 | Nearman ............................ 414/134 X |
| 3,581,887 | 6/1971 | Radutsky . |
| 3,612,250 | 10/1971 | Thompson et al. . |
| 3,622,000 | 11/1971 | McClenny ............................ 198/680 X |
| 3,696,946 | 10/1972 | Hunter et al. ............................ 414/134 |
| 3,880,298 | 4/1975 | Habegger et al. ............................ 414/134 |
| 4,036,365 | 7/1977 | Rosenfeld . |
| 4,114,538 | 9/1978 | Nicodemus, Jr. et al. ............... 198/680 X |

OTHER PUBLICATIONS

*Industrial Laundry Conveyor Systems*, White Machine Company, Inc.

Primary Examiner—Robert J. Spar
Assistant Examiner—Edward M. Wacyra
Attorney, Agent, or Firm—Lerner, David, Littenberg & Samuel

[57] ABSTRACT

Apparatus and methods for selectively distributing a plurality of unordered articles at a plurality of receiving stations in predetermined orders are provided in accordance with the teachings of the present invention. The present invention contemplates a plurality of receiving stations wherein each receiving station is to receive a plurality of selectively distributed ones of a plurality of articles in a predetermined order. A conveyor system is provided for releasably supporting the plurality of unordered articles to be selectively distributed and for displacing releasably supported ones of the plurality of unordered articles in a path adjacent to the plurality of receiving stations. The conveyor system has at least one portion for receiving the plurality of unordered articles sequentially and releasably supporting the plurality of unordered articles in the sequence received. Release mechanisms are provided at each of the plurality of receiving stations for selectively releasing an article from the conveyor system for distribution to the receiving station in a predetermined order. Each of the receiving stations are provided with sensors for identifying each article displaced thereby as a function of the article's position in the sequence of unordered articles and the release mechanism is effectively activated at each of the plurality of receiving stations when an article being displaced thereby is to be distributed to that receiving station and is the next succeeding article in the predetermined order to be distributed to that receiving station.

39 Claims, 7 Drawing Figures

APPARATUS AND METHOD FOR ASSEMBLYING RANDOMLY ARRANGED ARTICLES

BACKGROUND OF THE INVENTION

The present invention relates to an apparatus and method for sorting and/or arranging randomly arranged articles, and more particularly to an apparatus and method for arranging a plurality of randomly arranged articles into a predetermined order. Such an apparatus and method are particularly useful in laundry and cleaning plants wherein the identifiable articles comprise items of clothing which, after washing, drying, pressing, etc., must be assembled into a predetermined order for subsequent pick up and/or delivery to the customers.

Various types of sorting and assembling apparatus and methods have been used in laundries over the years. Some of these prior art apparatus have been concerned with sorting of randomly arranged articles into groups or lots each corresponding to the items of clothing of particular customers. More particularly, in some commercial laundries, customers may bring in several different items of clothing which are sorted into different groups or lots according to the type and/or kind of item so that similar types and/or kinds of items will be cleaned by similar processes or operations. In these types of commercial laundries, all of the customer's items are tagged or marked with the same identifying number or other indicia so that the items can be assembled or collected together after cleaning. Various types of apparatus have been proposed for accomplishing such sorting of the articles into bundles or lots which each represent the items of a particular customer.

For example, U.S. Pat. No. 1,217,988 is directed to such a sorting apparatus for use in a laundry in which articles of particular customers are assembled together after being washed at several different receiving and collecting stations. All the items of laundry of a particular customer are initially tagged with the same identifying tag or key so that all the items of a particular customer have the same designation. The tags of a particular designation are different from the tags of other designations (in terms of overall size, and in terms of the location and size of slots or grooves cut thereinto). After numerous customers' clothing items have been washed and dried, all of the clothing items are arranged on a conveyor which travels past the plurality of receiving and collecting stations. By appropriately arranging trip devices and spacing of track members, the clothing items of a particular customer are dropped from the conveyor and directed to a particular receiving and collection station whereas the clothing items of other customers are dropped off the conveyor and directed to other receiving and collection stations. Each collection and receiving station is adapted to receive and collect all the items of clothing having a particular tag designation.

Other similar examples of sorting and assembling apparatus are shown for example in U.S. Pat. Nos. 1,808,405, 1,808,406, and 2,362,683. With each of these prior art arrangements, the plurality of different items are assembled by lot (but still in a random order) at a plurality of different receiving and collecting stations. However, as the articles are delivered to the collection stations in the random order that they are initially arranged on the conveyor, only those articles of clothing of a particular customer may be assembled together. Thus, a single collecting station is necessary for each cutomer's item of clothing.

Other prior art laundry assembly apparatus are concerned with arranging the items of a large plurality of cleaned items into a specified order as opposed to merely sorting of the items into different groups or lots in which the items in each group are randomly arranged. For example, in some commercial laundries for mass cleaning large numbers of clothing items such as uniforms or factory work clothes, it is again commonplace to clean, dry, etc. all similar items of clothing, and to afterwards assemble or arrange such items into a suitable order for pick up and/or delivery to the customer. In such laundry plants, it is common to use an identification number or other indicia to represent (i) the particular route which serves such customer, (ii) the customer's account number, and (iii) the various items of clothing of the customer. It is preferable when sorting the cleaned articles that the articles be arranged in a particular order so that all of the clothing items of a particular route will be arranged together, and in an order such that all of the items of each customer are also arranged together and in a particular order, such as might be desired by the customer. In this way, the articles may be simply placed into the delivery truck in order such that as the delivery person makes each customer's stop, that particular customer's items will be easily accessible to be taken off in order and delivered to the customer.

Thus, in arranging the particular clothing items according to routes, customers and items, prior art arrangements have performed at least three separate sorting operations on the initial randomly arranged batch of items. For example, initially, the cleaned and laundered items might be sorted according to route, which for example may be represented by the first digit in the identification number or indicia on the clothing items. This has been performed for instance by a person manually taking each item of clothing, looking only at the first digit, and placing the item on a conveying device which, by means of an appropriate trip device or arrangement, conveys and transports such items to a particular receiving station which represents all of the items for a particular route. Thus, with four digit identification numbers on which the first digit represents the route, all of the 1000 numbered items will be delivered to one delivery station, all the 2000 items to a second delivery station, etc. Then, the articles of each route are sorted according to customer or account number, which for example may be represented by the second digit or set of digits in the identification number. Again, this second sorting operation has been accomplished manually in the past by a person looking only at the second digit or set of digits and placing the articles on a conveyor which, by appropriate cams, levers, or other trip devices sorts the items of a particular route into specified groups representing the items for each particular customer. Finally, each particular customer's items are sorted and placed into a specified or desired order, such as for example simple numerical order according to the last digit or set of digits in the identification number. Again, this has been performed in the past by someone manually taking the items of clothing for a particular customer (which had previously been sorted by route and customer) and placing them on a conveyor for appropriate sorting into the desired order. The sorted items for each route are then assembled together for subsequent delivery to the customers.

As can be appreciated, such prior art arrangements necessarily involved a great deal of space as well as a great number of operations to accomplish a particular sorting operation to arrange particles into a predetermined order, for example one in which the articles are arranged according to route, with each of the articles of each route being arranged according to customer and each customer's articles being arranged in a particular order. In particular with respect to the last mentioned arrangement or system, it is to be noted that at least three separate sorting operations are necessary, either using three conveyor systems or using one conveyor system three or more times. Further, each sorting operation requires that a person manually place or identify each article so that it will be delivered to the appropriate receiving station. Such prior art systems are both very time consuming in operation as well as requiring a great deal of space and number of persons.

SUMMARY OF THE INVENTION

The present invention overcomes these and other disadvantages of the prior art and provides an apparatus and method for arranging a plurality of randomly arranged identifiable articles into a predetermined order. In accordance with the apparatus of the present invention, there is provided conveyor means for releasably supporting the randomly arranged articles and for conveying the articles supported thereon past at least one receiving station arranged about the conveyor means for receiving the articles. Identifying means are provided associated with the receiving station for identifying each article as it is conveyed past the receiving station. Release means responsive to the identifying means are provided for releasing the article identified by the identifying means from the conveyor means to the receiving station when the article identified is the next succeeding article in the predetermined order with respect to the articles previously received by the receiving station. Thus, articles are only removed from the conveyor means when they are the next succeeding article in the predetermined order. The remaining articles will remain on the conveyor for subsequent passes past the receiving station.

Accordingly, the sorting and arranging of these articles into the predetermined order may be accomplished with a single conveyor means which greatly reduces the space requirements and number of operations necessary for such sorting. Furthermore, once the articles are arranged on the conveyor means, the conveyor means may be operated at a relatively high speed, consistent with the identifying means being capable of identifying each of the articles and the response means being capable of releasing the articles in the proper order. Furthermore, such apparatus elminates the need for separate sorting operations to accomplish the desired results.

The method for arranging the randomly arranged articles into a predetermined order in accordance with the present invention comprises releasably supporting the randomly arranged articles on support means and moving the articles past at least one receiving station for receiving the articles. As each of the articles move past the receiving station, each article is released from the support means to the receiving station when the article is the next succeeding article in the predetermined order with respect to the articles previously received by the receiving station. The articles remaining on the support means continue moving past the receiving station until all of the articles on the support means are released to the receiving station. Again, this results in a significant reduction in the space requirements, as well as a significant reduction in the number of separate operations needed to accomplish a desired arranging of articles into a predetermined order. The step of moving the articles past the receiving station is simply repeated until all the articles are removed in the proper order.

In accordance with the preferred embodiment of the present invention, each of the randomly arranged articles is initially placed on the conveyor or support means in a support position with the support position and article identification being noted and recorded, such as for example in the memory of a digital computer. Then, as the articles are moved past the receiving station, the support position is noted which thus provides an indication of the particular article. If the article is the next succeeding article in the predetermined order, an appropriate release mechanism is actuated to release the article to the receiving station.

Further in accordance with the preferred embodiment, a plurality of receiving stations are provided about the conveyor or support means with each receiving station adapted to receive the articles in a predetermined suborder. For example, each of the receiving stations may be adapted to receive a particular section or group of the articles for a particular route with each of the articles received by the receiving stations being in the proper desired order according to customer or account number and according to the individual article order desired for the customer. For instance, the articles of each customer might be arranged according to employee number, and the articles for the customers arranged in order at the several receiving stations according to the delivery schedule or stops for the route. The articles at the several receiving stations can then be gathered or collected together to assemble all of the articles for a particular route. Alternatively, the pluralities of predetermined suborders at all the receiving stations may be assembled together to provide an overall predetermined order for the articles. This provision for a plurality of receiving stations serves to reduce the time necessary for accomplishing a sorting or arranging operation. The particular number of receiving stations used is dependent on time considerations, space requirements, cost considerations, number of routes to be sorted, etc.

These and other features and characteristics of the present invention will be apparent from the following detailed description in which reference is made to the enclosed drawings which illustrate a preferred embodiment of the present invention.

DETAILED DESCRIPTION OF THE PREFERRED EMBODIMENT

Figure 1:
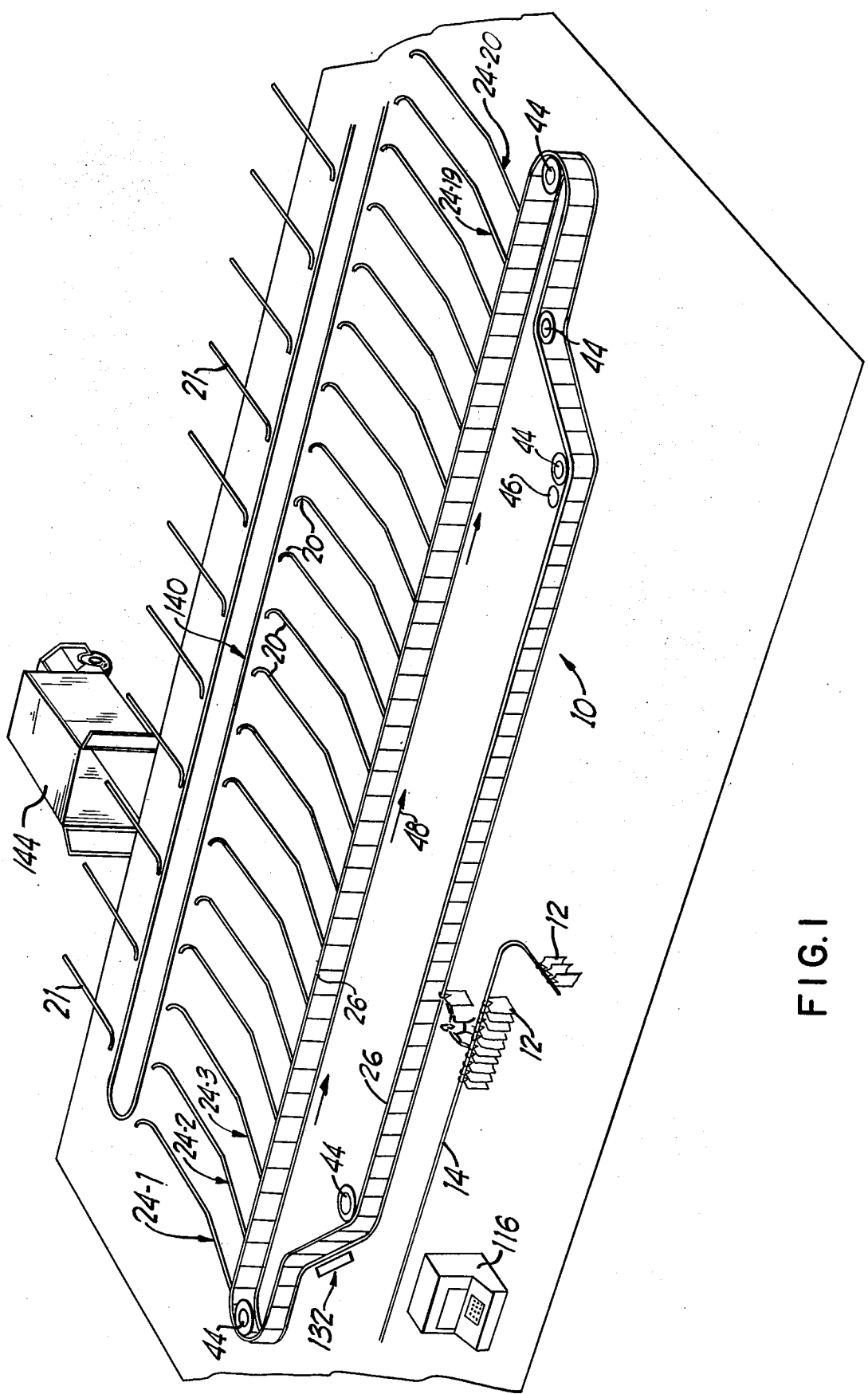
FIG. 1 is an overall perspective view of the apparatus in accordance with the present invention showing the apparatus in use for sorting of randomly arranged articles into a predetermined order in a commercial laundry.

Referring now the drawings in which like reference characters represent like elements, there is shown in FIG. 1 a perspective view of the overall apparatus 10 in accordance with the present invention for arranging a plurality of randomly arranged identifiable articles 12 into a predetermined order. The particular environment for the apparatus 10 shown in FIG. 1 is a commercial or industrial laundry in which the particular identifiable articles 12 to be assembled in a predetermined order comprise various types of clothing articles or garments which have been cleaned, dried, and if necessary, pressed. For example, a large plurality of cleaned and pressed articles or garments 12, such as for example 2500, are delivered to a presort holding line 14 in any conventional manner. The articles may for example come from a variety of different cleaning locations about the plant and be delivered to the holding line 14 by means of suitable conveyors, pipe tracks, or other conventional apparatus for transporting articles. The particular items of clothing 12 could for example comprise uniforms such as shirts, pants, lab coats, etc. which have been sent to the laundry plant for mass laundering and cleaning. In the embodiment shown, each of the articles 12 of clothing comprises a shirt which is delivered to the presort holding line 14 on a hanger 16.

It should be noted that each article or item of clothing 12 is marked or otherwise provided with an identification number or symbol 18 which identifies that particular item with respect to all of the other items. Typically, numeric and/or alphanumeric identifications are used. The identification marking or indicia 18 will for example include a portion or part for identifying the particular route (such as a number or letter representing the day of the week on which the clothes or items of clothing 12 are to be returned), a portion or part for identifying the account number representing the particular customer to which the articles 12 are to be delivered (for example a one to three digit number or symbol) and a portion or part for identifying the person to whom the articles 12 belong (such as a person's initials or a one to four digit employee number).

These identification markings or indicia 18 may be provided or attached to the garment 12 in any conventional manner. For example, they could be permanently sewn into the clothing or item 12, a separate tag could be attached to a portion of the clothing or item 12, or the hanger 16 could be tagged. In the embodiment shown, the identification marking 18 is heat sealed onto the item 12 (see FIG. 2). Furthermore, depending on the devices used for entering the identification number into the memory device or computer as discussed more fully hereinbelow, the identification marking or indicia 18 on the items of clothing 12 could comprise bar coded, or magnetic coded identification tags or indicia, as well as visible or even invisible indicia which may be read with an appropriate device or under a suitable light source. The codes or indicia can be either machine readable or human readable or both. Virtually any type of identification mechanism or system may be used which is most convenient for the particular customer's desires, uses, requirements, etc. The only requirement is that the individual articles 12 be separately identifiable, independent of the remaining articles 12. That is, the articles 12 must have separate identification numbers or symbols which are different from the identification numbers or symbols for the other articles 12 to be sorted and assembled into the predetermined order.

The apparatus 10 in accordance with the present invention is designed to take a particular batch or group of articles 12 which have been transported to the presort holding line 14 in a randomly arranged order (i.e., not in any particular order), and to then sort and arrange the articles 12 into a desired predetermined order. With respect to a typical industrial laundry, with respect to which the present invention is particularly useful, the desired predetermined order may for example comprise arranging the particular articles 12 into a plurality of different groups or sublots each of which is in turn arranged in a predetermined order or suborder. More particularly, the desired order may be one in which the articles 12 are arranged according to route number, customer stop or account number within each route, and, for each customer or account, an arrangement according to the particular desires of the customers, such as for example simple numerical order for the individual items 12 if the person indicia comprise numeric characters, or alphabetical order if initials are used. Alternatively, the arranging apparatus 10 in accordance with the present invention could be used to arrange initially randomly arranged articles 12 into simple numerical order, for example from 1 to 2500. Of course however, the apparatus 10 could be used to arrange articles into still other predetermined orders which will be apparent to those skilled in the art.

In the preferred embodiment, the sorted articles 12 are arranged in the desired predetermined order or suborders along a plurality of different drop lines 20. For example, each drop line 20 holds a group or section of articles 12 for a particular route. Preferably, all of the articles for a particular route are collected on several drop lines 20. The articles from the drop line 20 representing a particular route can then be gathered together, along bar or track 140 and assembled onto a route delivery line 21 and then loaded onto a delivery vehicle 144. The articles 12 are preferably arranged along the individual drop lines 20 in an order which is most convenient for the particular route along which they are to be delivered, and more preferably in an order such that the articles 12 of the customer or account whose items 12 will be first delivered are located at the end of the line of articles assembled on the delivery line 21 so that when the articles 12 are collected along the delivery line 21 and are loaded into the delivery vehicle 144, the last loaded articles 12 will be the first articles to be taken off at the first delivery stop. Further, within each customer's group, the individual articles 12 are also arranged in a particular order such as for example according to the individual persons whose clothing items are being cleaned.

Thus, in accordance with the present invention, the randomly arranged articles 12 at the presort holding line or station 14 are initially loaded onto an appropriate conveyor or support apparatus 22 which is then operated to drive the articles 12 past a plurality of receiving stations 24 which for example may be located on the other side of the endless conveyor 22. Although the receiving stations 24 are shown arranged in a straight line, it should of course be realized that the receiving stations 24 could be arranged at any location about the conveyor apparatus 22. At each receiving station 24, each of the articles 12 is identified in an appropriate manner (the particular manner to be discussed more fully hereinbelow). If the article 12 is identified at the receiving station 24 is the next succeeding article 12 with respect to the articles 12 previously received by that receiving station 24, release means are actuated for releasing that article 12 to the receiving station 24. Otherwise, the article 12 remains on the conveyor 22 and continues past the other receiving stations 24 until the appropriate time is reached for removing the article 12 at the appropriate receiving station 24. Therefore, at each receiving station 24, the first article 12 for the sort being conducted for that station is first removed from the conveyor apparatus 22, followed by the next succeeding article 12 therefor, etc., until all articles for each receiving station 12 have been unloaded in the precise sequence assigned to each receiving station through what is generally multiple passes of said conveyor apparatus 22 by each receiving station 12. Thus, as only the articles 12 on the conveyor 22 which are the next in line articles in a predetermined order are removed from the conveyor 22 as the conveyor 22 moves the articles 12 past the receiving stations 24, it is expected that the conveyor 22 will make several or numerous passes or revolutions (depending on the number of articles 12 to be sorted) past the receiving stations 24 until all of the articles 12 are removed, at which time the articles 12 will be arranged in the desired predetermined order.

For the sake of convenience in illustrating the manner of operation in accordance with the present invention, it will be assumed that the desired predetermined order of the identifiable articles 12 will be a relatively simple order corresponding to a sequential, numerical order in which the articles 12 are arranged in sequential order according to tag or indicia identification in twenty different lots or groups each comprised of 125 different articles. However, it should be realized that although simple numerical order was chosen for this example, the identifiable articles 12 can be arranged into any predetermined or desired order with the method and apparatus of the present invention. Thus, the initial number of randomly arranged articles 12 in this example will be 2500 which are to be sorted so that the first receiving station 24-1 receives articles 12 numbered "1"–"125" arranged in sequential order, whereas at the second receiving station 24-2, articles 12 numbered "126"–"250" are received in order, with articles numbered "251"–"375" being arranged in order at the third receiving station 24-3, etc. After all 2500 articles 12 have been loaded onto the conveyor 22 and their conveyor positions recorded by an operator in computer 116, the conveyor 22 is started to move the articles 12 past the receiving stations 24. At each receiving station 24, each article 12 is identified in an appropriate manner and, if the article is the next succeeding article 12 in line for that particular receiving station 24, it will be removed from the conveyor 22 to the receiving station 24, the computer 116 also maintaining a list of the articles and their sequence to be unloaded at each receiving station and defining the next article for each receiving station to be unloaded. If the article 12 is not the next-in-line article at that particular receiving station, it will pass on to each succeeding receiving station 24 in sequence where it will be identified and compared with respect to the next article 12 to be received thereby as determined by the next succeeding article in the, predetermined suborder for each receiving station 24. If it is the next succeeding article 12, it will be removed; if it is not, it will continue to pass to the next receiving station 24, and so on.

Thus, the article 12 numbered "1" will be removed at the first receiving station 24-1 as it passes the first receiving station 24-1. If article numbered "2" is immediately behind article numbered "1", it also will be removed at the first receiving station 24-1. However, if the article 12 numbered "3" were initially arranged before the article numbered "1", the conveyor 22 would continue conveying the articles 12 past the first receiving station 24-1 (without any being removed) until the article numbered "3" is moved past the first receiving station 24-1, at which time it would then be removed from the conveyor 22 and delivered to the receiving station 24-1. During this operation, the article 12 numbered "126" will be delivered to the second receiving station 24-2, with the article 12 numbered "251" being delivered to the third receiving station 24-3, etc., each separate list and the appropriate next item to be removed at each station being maintained and defined by the computer 116.

Accordingly, it is clear that the articles 12 will remain on the conveyor 22 until such time that it is appropriate for them to be removed to the respective receiving stations 24 so as to be in the desired predetermined order or suborders. As noted above, it is expected that the conveyor 22 will make several revolutions before all of the articles 12 are removed as at least some of the articles 12 will remain on the conveyor for subsequent passes past the receiving stations 24 so long as the initial random order does not correspond to the finished predetermined order on a per station basis. Further, it should be noted that only one sorting operation takes place to accomplish what previously took at least three separate sorting operations (either done by different conveyor mechanisms or done several times with the same conveyor mechanism, or even done manually).

Figures 2, 4:
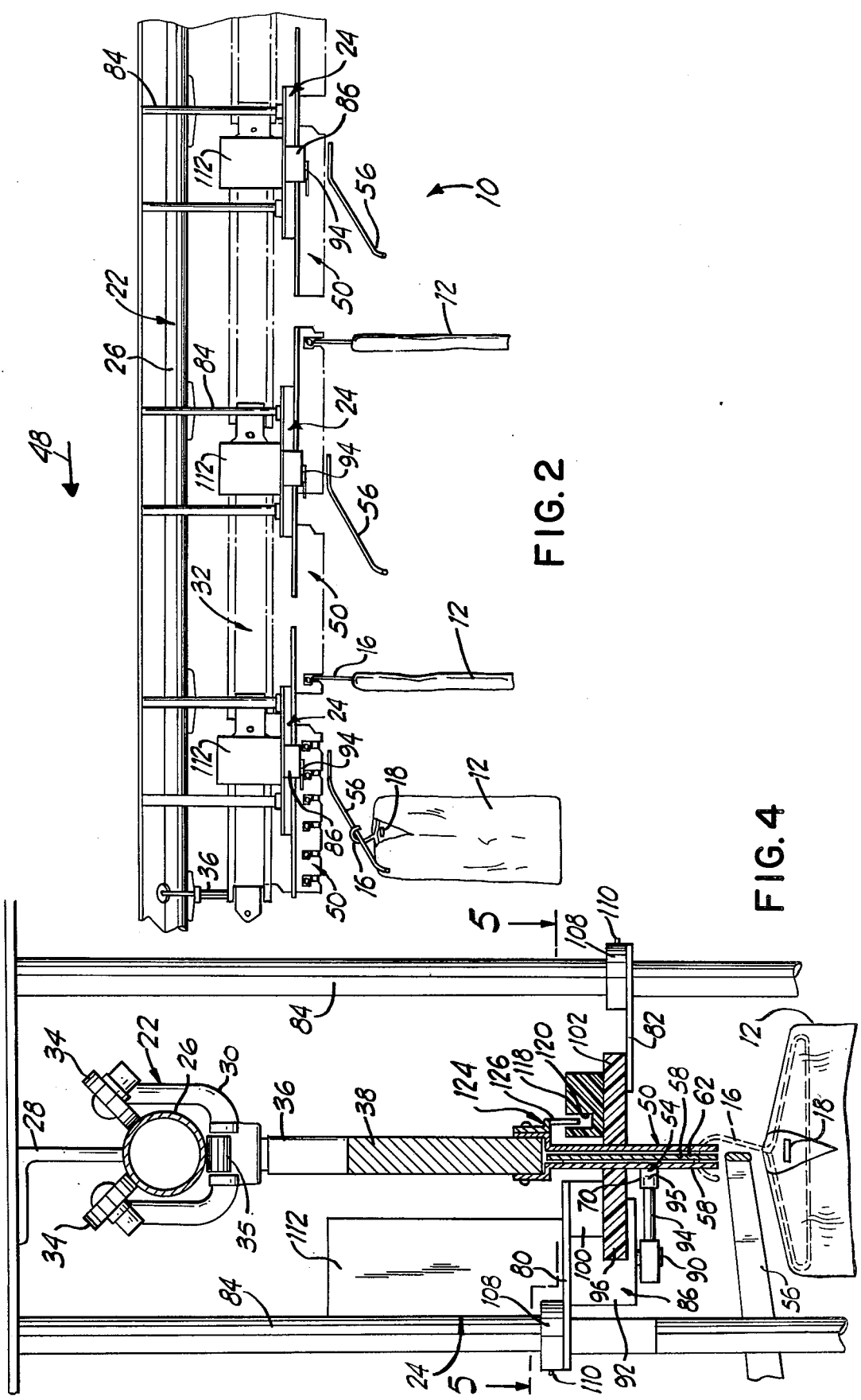
FIG. 2 is an elevational view of a portion of the apparatus shown in FIG. 1, illustrating a plurality of receiving stations for receiving the articles in a predetermined suborder at each receiving station.
FIG. 4 is a view, partially in section, showing details of a receiving station employed within the embodiment of the invention disclosed herein.

Turning now to a discussion of the specific apparatus 10 in accordance with the present invention for arranging the randomy arranged articles into a predetermined order, FIG. 2 shows an elevational view of a plurality of different receiving stations 24 for receiving the articles 12, and which also illustrates the conveyor apparatus 22 for releasably supporting the articles 12 and for conveying the articles 12 supported thereon. More particularly, the conveyor apparatus 22 comprises an endless support track or pipe 26 arranged above the floor of the laundry plant. In the preferred embodiment, the pipe track 26 is supported from above by means of an appropriate supporting structure which comprises a suitable grid structure having depending support rods 28 to which the pipe track 26 is fixedly secured. Alternatively, the track 26 could be supported by means of support bars extending upwardly from the floor of the plant. The track 26 may be arranged at a single elevation, or more preferably (although not shown) at a plurality of different elevations in order to provide a sufficient length for the entire conveyor apparatus 22 to support the desired number of articles 12, namely on the order of 2500 in the preferred embodiment.

The pipe track 26 supports, by means of a plurality of yoke structures 30, an endless conveyor chain link system 32 of a suitable design. The supporting yoke structures 30 comprise a U-shaped support bar having a pair of rollers 34 supported at the upper ends of the two legs for rollingly supporting the chain link structure 32 from the pipe track 26 in a conventional manner. A second set of rollers 35 are supported by the yoke structure 30 below the track 36. This for example can best be seen in FIG. 4 which shows an end view of one supporting yoke structure 30.

Figure 3:
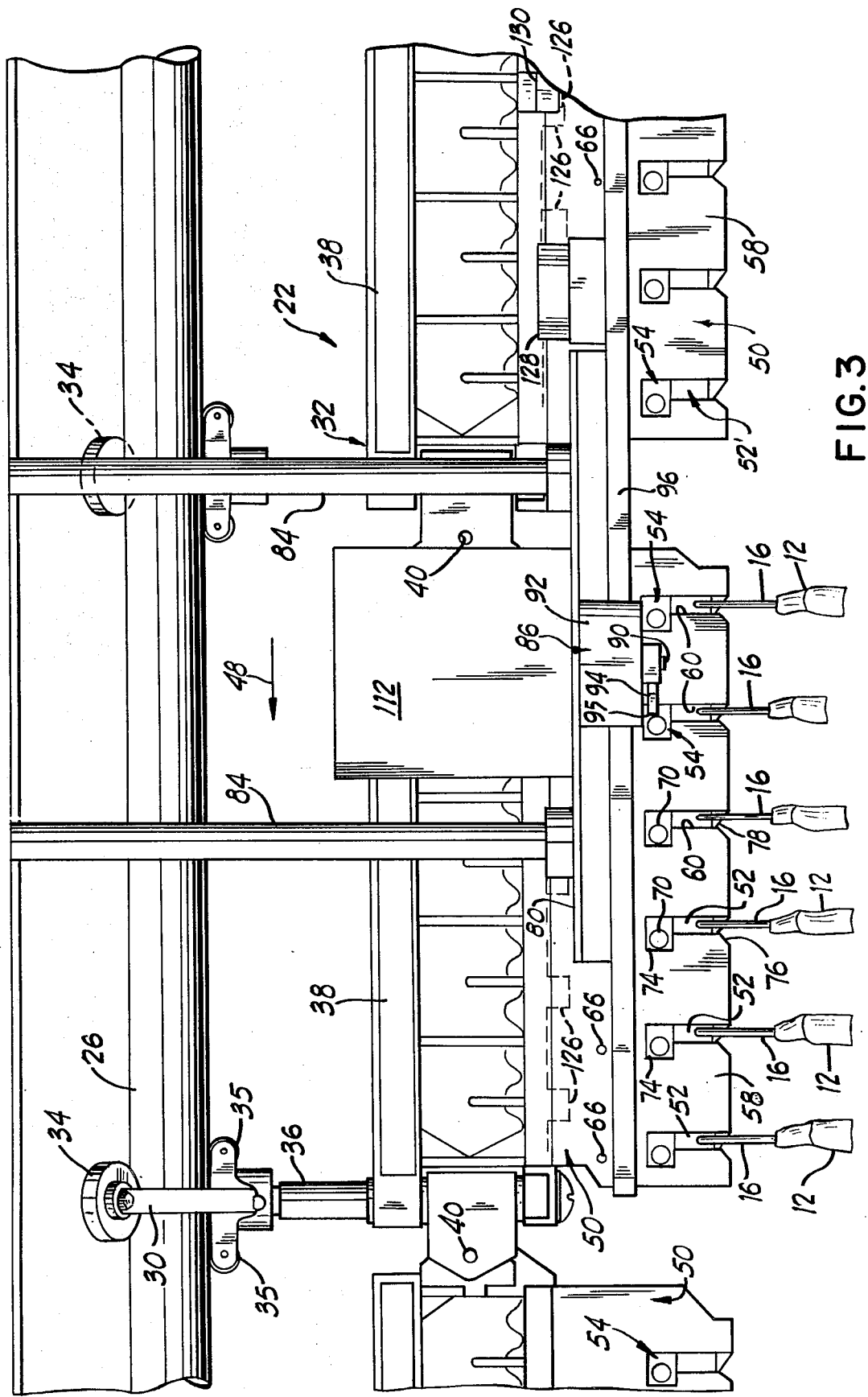
FIG. 3 is a side elevational view, with certain components removed for clarity, illustrating the conveyor apparatus and one receiving station.

The yoke structure includes a depending yoke support arm 36 to which the individual chain links 38 of the endless conveyor chain link system 32 are connected. Each chain link 38 comprises a rigid structural member which is connected to its adjacent chain links 38 so as to be pivotal about a horizontally extending pin connection 40 in order to accommodate transitions between the different elevations of the pipe track 26 as well as to be pivotal about the vertically depending support rod 36 so as to be able to accommodate bends or turns of the pipe track 26. This for example can best be seen in FIG. 3.

The endless conveyor chain link system 32 is driven about the endless pipe track 26 by means of suitable chain sprockets 44 and drive motor 46 which engage the chain links 38 (see FIG. 1). The direction of travel of the chain links 38 past the receiving stations 24 is shown by the arrow 48 in FIGS. 2, 3 and 5. This arrangement of a connected chain link system 32 and pipe track 26, and the arrangement for supporting same for movement thereabout is one type of conventional conveyor apparatus 22 used in laundry plants. Of course however, other types of arrangements could be utilized if desired.

Each chain link 38 supports a carrier member 50 suitably secured to the lower portion thereof. The carrier members 50 each have a plurality of supporting positions 52 at which the individual articles 12 are releasably supported by means of suitable supporting or holding devices 54. In the preferred embodiment, the releasable holding devices at the supporting postions 52₁-52ₙ each comprise swingable latch members 54 which are biased towards the holding position for supporting the hanger 16 on which the article 12 is hung and which are swingable in a manner so as to release the hanger 16 and article 12 to fall by gravity onto a guide bar 56 at the receiving station 24.

Figure 6:
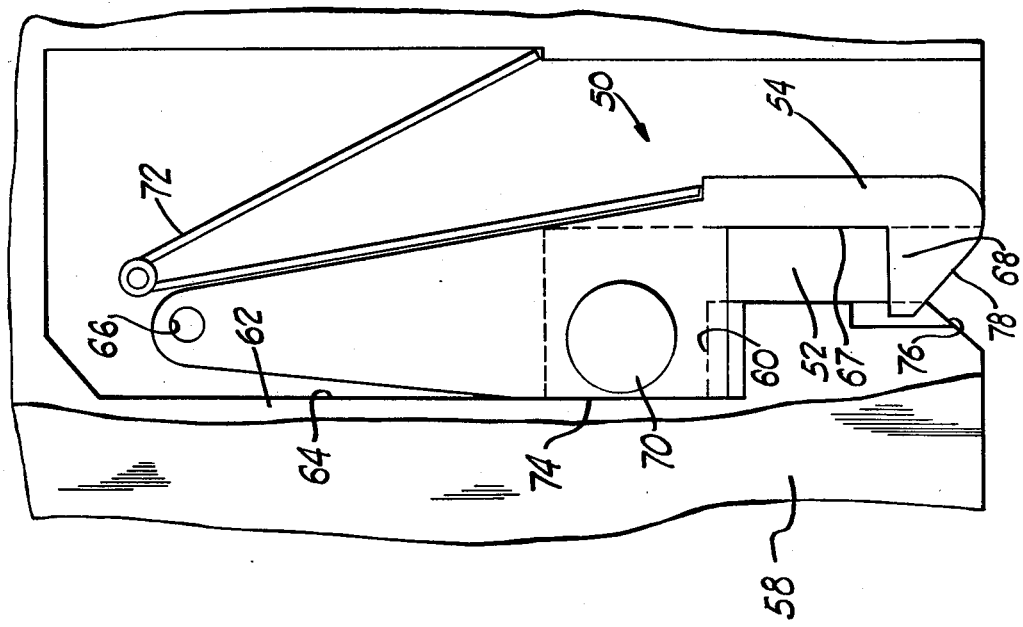
FIG. 6 is an enlarged sectional view of a carrier member carried by the conveyor apparatus, partially broken away to illustrate the latch mechanism for releasably supporting the individual articles.

More particularly, the carrier member 50 is comprised of a pair of spaced carrier plates 58 (see FIG. 4) each provided with a plurality of evenly spaced slots or recesses 60 cut therein and open at the lower edge. The two carrier plates 58 are spaced from one another by a spacer plate 62 having a plurality of suitable recesses 64 for housing the latch members 54 for swinging movement therein (see FIG. 6). Within each of these recesses 64 there is provided a latch member 54 which is pivotally supported by means of a pin 66 which is supported in appropriate holes in the two carrier plates 58. The lower end or tip 68 of each latch 54 is provided with a recessed portion or cutout 67 for supporting a hanger 16 (on which an article 12 is hung) in the slotted portion 60 of the carrier plates 58. The latch 54 is also provided with a projection 70 which extends outwardly through the upper portion of the slot or recess 60 in one of the carrier plates 58. A suitable torsion spring 72 is also provided for biasing the latch member 54 about its pivot pin 66 so that the projection 70 engages the forward edge 74 of the carrier plate slot or recess 60. However, the latch 54 is swingable (in a counterclockwise direction as viewed in FIG. 3) to move the lower tip 68 thereof out of blocking relationship with the lower end of the slot 60 in the carrier plates 58.

The lower forward edge 76 of the slot 60 cut in the carrier plates 58 is tapered, as is the facing lower edge 78 of the latch 54 so as to provide a tapered entrance way for the article hangers 16 to be slid upwardly into the slotted portion 60 in the carrier plates 58. This upward movement of the hanger 16 will cause the latch 54 to swing in a counterclockwise direction until the hanger 16 is above the cutout portion 67 of the latch 54 at which time the spring 72 will force the latch 54 to return to its holding position. The articles 12 may be simply released from the carrier members 50 by pivoting of the individual latches 54 in the counterclockwise direction which allows the hanger 16 to fall from the slot 60. As will be more fully discussed hereinbelow, this pivoting action will be provided by engaging the stop projection 70 on the latch 54 as the carrier member 50 moves in the forward direction (in the direction of the arrow 48 in FIG. 3).

Thus, carrier member 50 provides a convenient means for releasably supporting the individual articles 12 by hangers 16 so as to depend below the pipe track 26 and chain link conveyor 32. Preferably, the carrier supporting positions 52₁-52ₙ are spaced at even intervals on each of the carrier members 50. The spacing should be such that the release mechanism for engaging the stop projection 70 on the latch 54 will have sufficient time to effect a release of one article 12 before the next article is moved therepast. For example, in the preferred embodiment, the chain links 38 are connected together on twelve inch centers with one carrier member 50 being secured to each link 38 and each carrier member 50 having six supporting positions 52 evenly spaced therein.

Arranged at suitable intervals about the conveyor system 22 there are provided a plurality of receiving stations 24 for receiving the articles 12 released from the carrier members 50 (three of which are shown in FIG. 2). The receiving stations 24 serve to support the release mechanism and identifying apparatus used in effecting release of the articles 12 from the conveyor system 22, as well as a guide bar 56 for receiving the released articles 12 and directing them to the delivery line 20.

Figure 5:
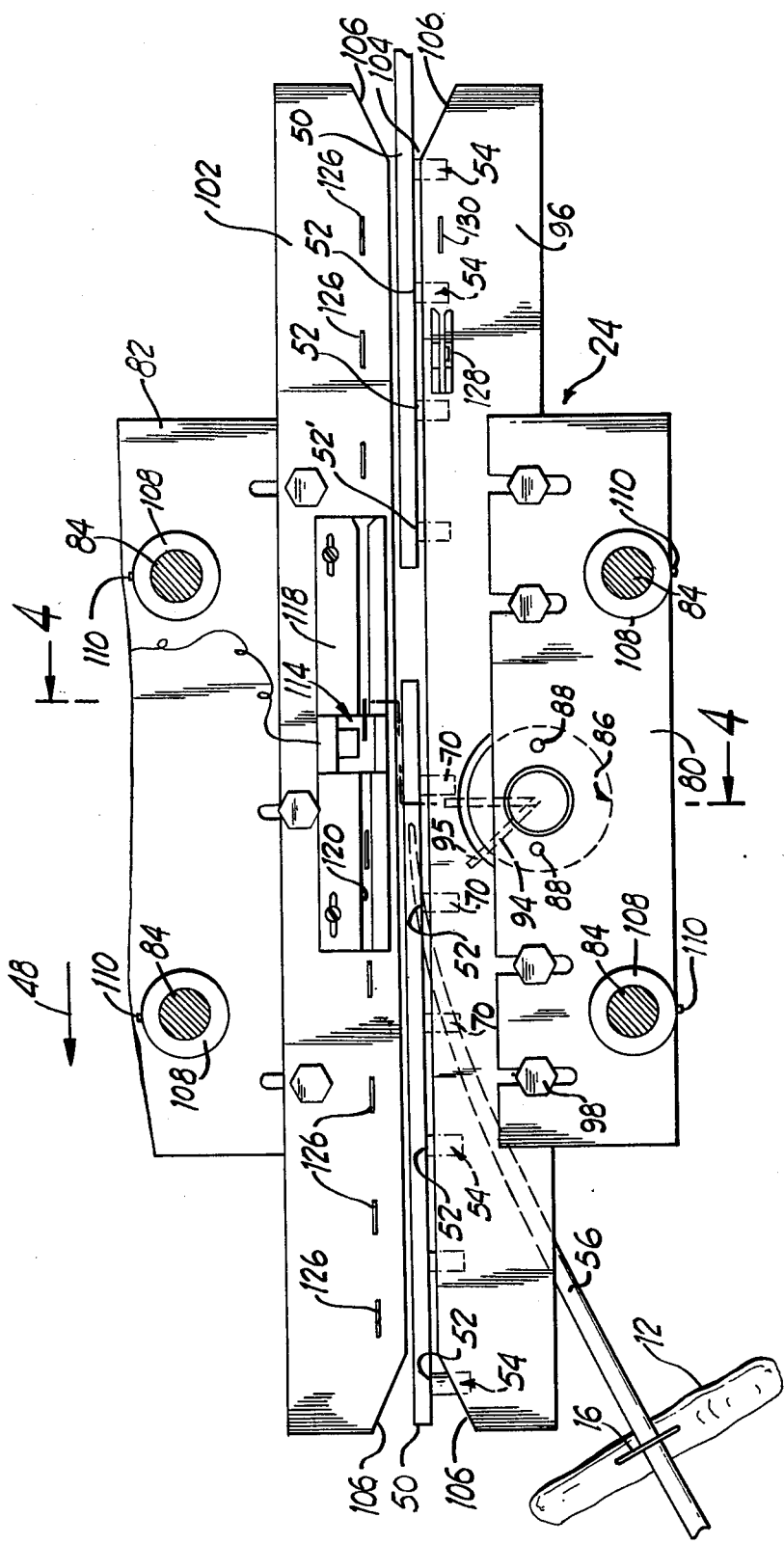
FIG. 5 is a top sectional view taken along lines 5—5 of FIG. 4 showing the portion of the conveyor apparatus moving past a receiving station and depositing an article thereat.
Figure 7:
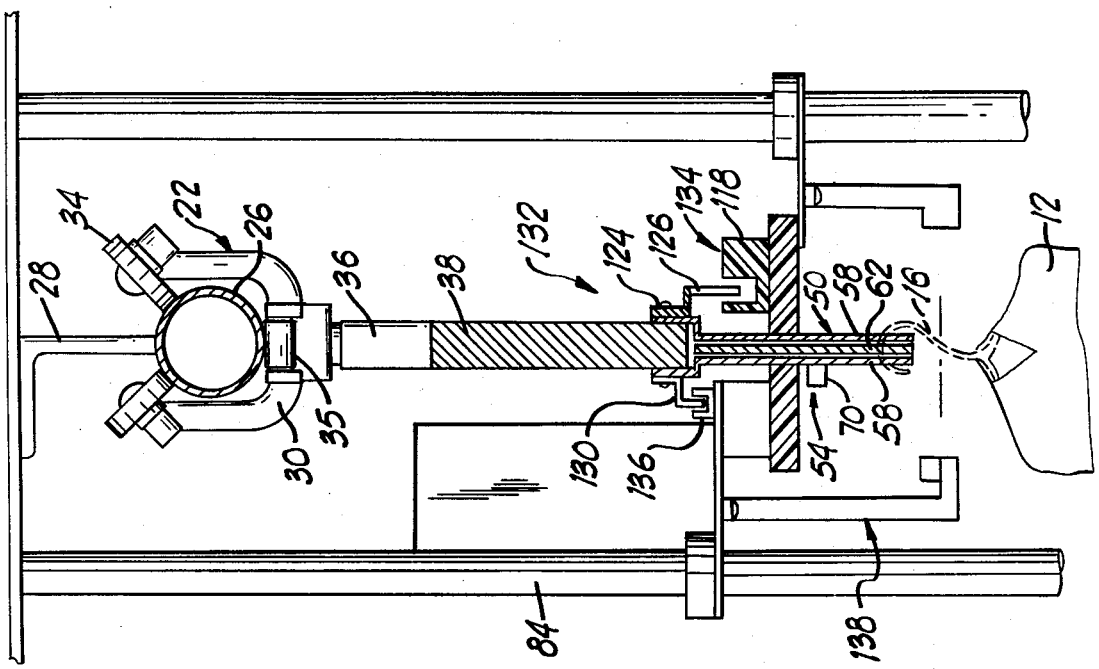
FIG. 7 is a sectional view, similar to that shown in FIG. 4 for a receiving station, of an induction station which is used in recording the conveyor support positions at which the articles are supported.

In the preferred embodiment, the receiving stations 24 each include a pair of mounting plates 80, 82 each of which is supported by a pair of support rods 84 on opposite sides of the conveyor system 22 (see FIGS. 4 and 5). The supporting rods 84 are in turn supported from the supporting grid structure for the conveyor system 22. One mounting plate 80 mounts a rotary releasing solenoid 86 actuable to effect a release of the individual articles 12 from the carrier members 50.

The solenoid 86 is supported from the lower side of the mounting plate 80 by means of suitable screws 88 and includes a central rotatable shaft 90 extending vertically below the solenoid housing 92 and to which a radially extending release arm 94 is secured. The end of the release arm 94 extends radially beyond the housing body 92. The normal position of the release arm 94 is shown in solid outline in FIG. 5 in which the tip or outer end 95 thereof is out of the path of movement of the articles 12 supported on the conveyor system 22. However, the release arm 94 is rotatable in approximately a 45° arc (in a clockwise direction as shown in FIG. 5) to move the tip 95 of the release arm 94 into blocking relationship with respect to a latch projection 70 so that as the carrier member 50 is continued to be moved past the solenoid 86, the tip 95 of the release arm 94 will engage the projection 70 and pivot the latch 54 towards the release position to release the hanger 16 supported thereon. Deactuation of the solenoid 86 will return the release arm 94 to its rest position shown in FIG. 5.

The mounting plate 80 also supports on its lower side one guide rail 96 secured thereto by means of bolts 98. A spacer bar 100 may also be provided to properly position the guide rail 96 at the proper elevation. On the opposite side of the conveyor system 22 there is provided a second mounting plate 82 which serves to support a second guide rail 102 on its upper surface. The pair of guide rails 96, 102 together define a guide slot 104 therebetween through which the carrier members 50 are designed to pass with the latch projections 70 being arranged below the guide rails 96, 102 (see FIGS. 4 and 5). The ends 106 of the guide rails 96 are both tapered to provide an entrance way and exit way for the carrier members 50 in moving past the receiving station 24. The two guide rails 96, 102 are preferably made of a suitable plastic material such as for example a phenolic plastic material or nylon to provide for smooth movement of the carrier member 50 therebetween.

Both of the mounting plates 80, 82 on the opposite sides of the conveyor system 22 are supported at the proper elevation by means of collars 108 secured to the plates 80, 82 and in turn secured to the support rods 84 by means of set screws 110. Also, on the upper surface of the mounting plate 80 for the rotary solenoid 86 there is provided a power supply and terminal connector housing 112 for housing various components for supplying power and terminal connections to the rotary solenoid 86 and other components associated with the receiving station 24.

On the upper surface of the second guide rail 102 and located opposite from the rotary solenoid 86 there is provided a sensing device 114 which is used in determining the identity of the articles 12 passing through the receiving station 24 and which are approaching the rotary release solenoid 86. In accordance with the preferred embodiment, this determination of the identity of the articles 12 comprises initially entering and recording in a suitable memory device 116 (such as for example a computer) the identity of each article 12 and the particular supporting position $52_1$–$52_N$ at which it is supported and then determining, at each receiving station 24, the particular supporting position $52_1$–$52_N$ which is moving through the receiving station 24 and approaching the releasing solenoid 86 so that the article next approaching a given station may be compared to the next article to be off loaded at that station and if a comparison is achieved off loading occurs. In the preferred embodiment, the particular supporting positions $52_1$–$52_N$ for the articles 12 are determined with respect to a reference or start supporting position 52' so that determination of the supporting position $52_1$–$52_N$ moving past the receiving station 24 and approaching the releasing solenoid 86 simply involves maintaining a count of the number of support positions $52_1$–$52_N$ which have passed after the reference supporting positions 52'. Once the particular supporting position 52 is known, the identity of the article 12 can be determined and from this, a determination of whether to release the article 12 or not by simply comparing the next item to be removed for a receiving station with the item passing that receiving station.

More particularly, in the preferred embodiment, the sensor 114 is in essence designed to operate as a switch to be used in determining which particular supporting position $52_1$–$52_N$ is approaching the rotary solenoid 86. The sensor 114 is centrally supported in a guide block 118 on the upper surface of the guide rail 102. The guide block 118 includes a guide slot 120 arranged in line with a gap or slot 122 of the sensor 114. A vaned member 124 is secured to the carrier members 50 and chain links 32. The vaned member 124 includes a plurality of vanes 126 which depend downwardly therefrom and which are arranged to be guided through the slot or gap 122 in the sensor 114 to interrupt the sensor 114. For this purpose, the guide slot 120 of the block 118 is preferably made of a suitable low friction plastic material, such as for example nylon. In the preferred embodiment, the sensor 114 comprises a Hall effect vane switch, and the vanes 126 are made of a suitable ferrous or iron magnetic material for disturbing the magnetic field produced by a permanent magnet in the sensor 114. This in turn disturbs the Hall effect induced voltage and cause the switch 114 to open.

This interruption of the sensor 114 is sensed by an appropriate computing device, such as for example a digital computer 116, which is also programmed with the desired predetermined order for which items are to be accumulated at each receiving station 12 in an appropriate manner so that it will determine whether that particular article 12 which is passing the receiving station 24 is the next succeeding article 12 in the predetermined order or suborder for that receiving station 24. This computation by the computer 116, as can be appreciated by those skilled in the art, may be performed by the computer 116 very quickly, on the order of a few microseconds. If the computer 116 determines that the article 12 is to be released, it generates a signal to actuate the rotary solenoid 86 to effect a release of the article 12 by swinging the projecting arm 94 into the path of the latch projection 70 so that, as the carrier member 50 moves past the rotary solenoid 86, the latch 54 is pivoted away from the slot 60 to release the hanger 16 which then falls by gravity onto the guide bar 56 of the receiving station 24 arranged beneath the mounting plates 80, 82 and carrier member 50. The hanger 16 will then slide out of the way, such as to the delivery line 20. This sequence for delivering and, if appropriate, effecting release of an article 12 is started when the leading edge of a vane 126 interrupts the sensor 114 and is terminated when the trailing edge passes the sensor 114 which serves to deactuate the solenoid 86 to return the projecting arm 94 to its rest position.

As can be appreciated, the particular arrangement of the vanes 126 with respect to the sensor 114, and in turn with respect to the supporting positions $52_1$–$52_N$ must be maintained within relatively precise limits so that the releasing sequence can be completed before the next article 12 is moved into position for possible release from the conveyor system 22. For this purpose, the vanes 126 are fixed onto the carrier member 50 so as to be in a fixed relationship with respect to the supporting positions $52_1$-$52_n$ and the sensor 114 is adapted to be positioned relative to the rotary solenoid 86 so as to effect the proper timing of the releasing sequence when the vanes 126 move past the sensor 114. In this way, the projecting arm 94 of the rotary solenoid 85 will be moved into blocking relationship with respect to the latch projection 70 at the appropriate time and will be returned to its rest position at the appropriate time so as to not interfere with the subsequent latch projection 70 unless the article 12 supported by the subsequent latch 54 is the next succeeding article to be released at the receiving station 24.

An noted above, in the preferred embodiment, the computation and determination of the approaching support position 52 comprises a simple counting of the number of support positions $52_1$-$52_N$ which have passed the sensor 114 relative to a start or reference support position 52' passing the sensor 114. To properly start this counting of the supporting positions $52_1$-$52_N$ there is provided at each receiving station 24, on the opposite side of the carrier members 50 from the vaned member 124 (i.e., on the side on which the rotary solenoid 86 is supported) a second sensing device 128 supported on the mounting plate 80. Thus second sensor 128 may for example be comprised of another Hall effect sensor or a photoelectric cell, which is designed to detect the "reference" or "start" support position 52' on the carrier members 50. For this purpose, a single vane or other "flag" 130 is supported from one of the carrier members 50 on the side opposite from the vaned member 124 which is designed to actuate the second receiving device 128 as it moves therepast. This actuation of the second sensor 128 will be sensed by the computer 116 to thus indicate that the vane 126 corresponding to the reference support position 52' is approaching the sensor 114 and to then reset the count of supporting positions $52_1$-$52_N$ as sensed by such sensor 114. It should be noted that this resetting of the count occurs at each receiving station 24 once for each revolution of the conveyor system 22.

As noted above, to accomplish the determination of the identity of each article 12 as it is moved past the receiving station 24, the identity of each article 12 must be entered into the computer 116 along with an indication of the supporting positions 52 at which it is placed. For this purpose, the articles 12 are preferably loaded onto the conveyor system 22 in the random order in which they are arranged at the holding line 14 with the first article 12 of the randomly arranged articles being placed in the reference position 52' which may be assumed to correspond to position $52_1$ the second article 12 in the random order being placed in the second supporting position $52_2$, the third article 12 in the third supporting position $52_3$, etc. In this manner, it is only necessary to enter the identity of the articles 12, as the first article identity entered will be recorded as being in the reference support position 52' and the subsequent article identities in the subsequent support positions $52_1$-$52_N$.

This entering of the identity of the articles 12 can be accomplished in any of a wide variety of different manners. For example, the identity could be entered by means of a keyboard using alphanumeric or numeric identification codes. Alternatively, voice entry techniques could be utilized, as well as scanning devices operating on optical, magnetic, or pneumatic principles.

Furthermore, this entry of the article identity into the computer 116 may be accomplished at a location remote from that at which the articles 12 are actually loaded onto the conveyor system 22 if the randomly arranged articles 12 are maintained in the random order between the location at which the identities are entered and the location at which the articles 12 are loaded. This latter, separate entry and loading procedure in which the identities of the articles 12 are initially entered into the computer 116 and the articles 12 then transported in order to the holding station 14 is preferred.

At the holding line 14, the conveyor system 22 is operated to bring the reference support position 52' into position for loading of the first article 12 in the random order. For example, the reference support position 52' could be identified by a chain link 38 which has been painted a different color. The articles are then loaded onto the conveyor system 22 by sliding each hanger 16 on which the articles 12 are hung upwardly into the carrier member slots 60 so that the latch member 54 will snap back and support the hanger 16 and article 12 therefrom with the first article placed into the reference position 52', the second article into the next adjacent support position $52_2$, etc. Preferably, the articles 12 are loaded into each supporting position $52_1$-$52_N$ so that there are no empty supporting positions. This for example may be accomplished by operating the conveyor system 22 at a relatively slow speed while a single person takes the randomly arranged articles 12 and loads each hanger 16 into the carrier slots 60 as the conveyor 22 slowly moves past him. Alternatively, automatic loading means could be utilized for accomplishing this function.

It should also be noted that it is possible to provide for multiple loading of the articles 12 after the identities of the articles 12 have been initially entered into the computer 116 in order to further speed up the loading operation to provide for a faster arranging operation. In this instance, the articles 12, after the identities have been entered, would be split or divided and delivered to the different loading stations for simultaneous loading onto the conveyor system 22. It of course should be realized that separate identifiable reference positions such as 52' would have to be provided and the computer 116 informed of the identities of the first article 12 in each group which are loaded at the separate loading stations so that an indication of the supporting position $52_1$-$52_N$ provides an accurate identification of the article 12 supported thereat.

In accordance with the preferred embodiment, of the present invention, a separate induction station 132 is provided to accommodate a situation in which some of the supporting positions $52_1$-$52_N$ do not have articles 12 placed therein, such as might occur when the loader misses a particular slot 60. As the identities of the randomly arranged articles 12 have already been entered into the computer 116 before loading of the articles 12, it is important to note the location of the empty supporting positions $52_1$-$52_N$ in order to adjust the entry of article identifications to compensate for these missed carrier slots 60. For this purpose, at the induction station 132, three sensing devices 134, 136, 138 are provided—one sensing device 134 for indicating the passage of a supporting position 52, a second sensing device 136 for indicating the passage of the reference support position 52' and a third sensing device 138 for determining whether an article 12 is located at the particular supporting position 52 identified by the first and second sensors 134, 136. The first two sensors 134, 136 correspond to, and preferably are identical to, the first and second sensors 114, 128 provided at each receiving station 24. The third sensor device 138, which may for example comprise a photoelectric detector, is arranged to sense whether an article 12 is supported at the support position $52_1$-$52_N$ and if so, to generate a signal to be sensed by the computer 116.

The third sensor 138 is preferably located a short distance downstream of the first sensor 134 at the induction station 132 so that after the first sensor 134 indicates that a support position $52_1$-$52_N$ is approaching the third sensor 138, the third sensor 138 within a specified time provided, will indicate whether an article 12 is supported at the identified support position $52_1$-$52_N$. For example, the third sensor 138 will preferably be located with respect to the first sensor 134 at approximately the position that the rotary solenoid 86 is located with reference to the first sensor 114 at each of the receiving stations 24. When a detecting vane 126 interrupts the first sensor 134, if an article 12 is present, the third sensor 138 will provide an appropriate indication or signal to the computer 116 to indicate the presence of an article 12. If no signal is generated during the time that the vane 126 interrupts the first sensor 114, the computer 116 will record this fact to indicate that an article 12 is not present at that particular support position $52_1$-$52_N$. After the conveyor system 22 has made one pass past the induction station 132, the computer 116 adjusts the article identifications accordingly to ensure that the correct article identification is provided for each support position $52_1$-$52_N$ relative to the reference support position 52'.

It is to be noted that the induction station 132 performs its operation of determining empty or unloaded supporting positions $52_1$-$52_N$ prior to any distribution of the articles 12 to the receiving stations 24. This is important in order that the correct correspondence between each of the supporting positions $52_1$-$52_N$ and the identifiable articles 12 is maintained. Furthermore, it is to be noted that all the articles 12 are to be loaded on prior to any distribution, and prior to operation of the induction station 132 to correct the correspondence between the identification of the articles 12 and the supporting positions $52_1$-$52_N$ on the carrier member 50.

Thus, it is seen that in accordance with the present invention, at each receiving station 24 (as well as at the induction station 132 initially) the computer 116 maintains a simple count of the number of supporting positions $52_1$-$52_N$ which have passed the sensor 114 at that receiving station 24 relative to the reference supporting position 52'. This is accomplished by noting when the reference support position 52' passes the sensor 114 (by resetting the count when sensor 128 senses the flag 130) and then simply keeping track or a running count of the number of interruptions sensed by the sensor 114. From this running tabulation maintained by the computer 116, and from the initial entry of the article identification, the computer 116 (which has been programmed with the desired predetermined order for each station) determines whether or not the article 12 should be released to a given receiving station 24 to achieve the desired, programmed order defined for each station. It should be noted that with use of a computer 116, the desired or predetermined order into which the articles 12 are to be arranged at each station can be easily and quickly changed for each batch of articles 12 which are to be sorted. If the article 12 is to be released, the rotary solenoid 86 is actuated just prior to the latch projection 70 passing the rotary solenoid 86 to move the arm 94 into blocking relationship therewith. The arm 94 remains in this position until the latch 54 has been moved out of the way to release the article 12, after which the arm 94 is returned to its rest position (by the trailing edge of the vane 126 ceasing interruption of the sensor 114). This manner of operation or procedure occurs at each receiving station 24. The conveyor system 22 continues to transport the articles 12 remaining thereon past the various receiving stations 24 until all the articles 12 have been removed therefrom in the programmed order for each station under the control of the computer and directed to the appropriate receiving stations 24 in the desired predetermined order.

It is to be noted that the described operation for arranging the articles 12 into a predetermined order can be performed with any number of receiving stations 24. However, a quicker sorting and arranging of the articles 12 into a desired predetermined order may be accomplished by utilizing a plurality of different receiving stations 24. Further in this regard, it should be noted that if the randomly arranged articles 12 are to be arranged in a predetermined order in a single continuous line, while it is possible to utilize only one receiving station 24, it is preferred that a plurality of receiving stations 24 be utilized in which the articles would first be arranged in different subgroups with each subgroup arranged in a predetermined suborder. After all the articles 12 have been so arranged into the predetermined suborders, the groups of articles 12 could be fed from the receiving stations 24, in order, onto an appropriate collecting track such as for example the single bar 140 shown in FIG. 1 to complete the overall desired predetermined order. More particularly, if a complete numerical order of 2500 articles is desired, 20 receiving stations 24 could be utilized each having 125 articles arranged with the first receiving station having articles numbered "1"-"125", the second receiving station "126"-"250", the third "251"-"375", etc. Then, all of the 125 articles on the first receiving station 24-1 would be fed onto the bar 140 with the 125 articles from the second receiving station 24-2 then directed onto the bar 140 behind the first set, then the third set, etc.

Further in this regard, it should be noted that it is preferable that the drive mechanism 46 for the conveyor system 22 comprise a variable or at least a two speed drive motor 46. The slower speed is for loading the articles 12 onto the conveyor system 22 whereas, the higher speed, for example on the order of 90 feet per minute, is for sorting and arranging the articles 12, once all the articles 12 have been loaded.

Further, it is to be noted that with use of a computer 116 for recording entry of the identifications of the individual articles as well as for calculating and determining whether the article 12 should be released to a particular station at any particular time, it is possible to vary the particular predetermined order which is desired. In fact, by properly programming the computer 116, any predetermined order may be obtained.

Thus, in accordance with the present invention there is provided an improved apparatus 10 and method for arranging a plurality of randomly arranged articles 12 into a predetermined order in which the articles 12 are conveyed by a conveyor means 22 past at least one receiving station 24. At each receiving station 24 each of the articles 12 is identified, and released to the receiving station 24 when the article 12 identified is the next succeeding article 12 in a predetermined order. Otherwise, the articles 12 remain on the conveyor 22 for subsequent passes past the receiving station 24 until all the articles are removed to the receiving station.

While the preferred embodiment of the present invention has been shown and described, it will be understood that such are merely illustrative and that changes may be made without departing from the scope of the invention as claimed.

What is claimed is:

1. Apparatus for selectively distributing a plurality of unordered articles in predetermined orders comprising:
   a plurality of receiving stations, each of said plurality of stations for receiving a plurality of selectively distributed ones of said plurality of articles in a predetermined order;
   conveyor means for releasably supporting said plurality of unordered articles to be selectively distributed and for displacing releasably supported ones of said plurality of unordered articles in a path adjacent to said plurality of receiving stations, and said conveyor means having at least one portion for receiving said plurality of unordered articles sequentially and releasably supporting said plurality of unordered articles in the sequence received;
   release means at each of said plurality of receiving stations for selectively releasing an article from said conveyor means for distribution to said receiving station;
   means at each of said plurality of receiving stations for identifying each article displaced thereby by said conveyor means as a function of said article's position in said sequence of unordered articles; and
   means for selectively activating said release means at each of said plurality of receiving stations when an article being displaced thereby by said conveyor means is to be distributed to that receiving station and is the next succeeding article in said predetermined order to be distributed thereto, said means for selectively actuating said release means being responsive to said means for identifying.

2. The apparatus of claim 1 further including collecting means for said plurality of receiving stations for collecting together in a desired order said plurality of selectively distributed ones of said plurality of articles received by said plurality of receiving stations in said predetermined orders so that said articles are arranged together on said collecting means in an overall order in which the articles are arranged in said plurality of predetermined orders with said predetermined orders of articles being arranged in said desired order.

3. The apparatus of claim 1 wherein said conveyor means comprises an endless conveyor having carrier means for releasably supporting said articles, and drive means for driving said endless conveyor to displace said articles supported on said endless conveyor in said path adjacent to said plurality of receiving stations.

4. The apparatus of claim 3 wherein said drive means includes variable speed drive means for driving said conveyor at a variety of different speeds.

5. The apparatus of claim 3 wherein said endless conveyor is comprised of a plurality of chain link members connected together to form an endless chain.

6. The apparatus of claim 5 wherein said chain link members are universally connected together to be pivotal about a pair of perpendicular axes which are each perpendicular to the direction of movement of said endless conveyor.

7. The apparatus of claim 5 wherein said carrier means comprise a plurality of carrier members supported by said chain link members, each carrier member including a plurality of spaced supporting means for releasably holding said articles.

8. The apparatus of claim 7 wherein each of said supporting means includes a latch member movable between a first position in which said latch member is adapted to support said articles and a second release position in which said latch member is adapted to release said article supported thereby.

9. The apparatus of claim 8 wherein each of said latch members is biased towards said first position and is movable to said second position by said release means.

10. The apparatus of claim 9 wherein said carrier members each include a plurality of slots each having an open lower end, and wherein each of said latch members is juxtaposed adjacent said open lower end of one of said slots so that a portion of said latch member is arranged in blocking relationship to said open lower end of said slot when said latch member is in said first position ans so that said portion of said latch is spaced from said open lower end of said slot when said latch member is in said second position.

11. The apparatus of claim 10 wherein said latch members are pivotally mounted to said carrier members to be pivotable between said first and second positions.

12. The apparatus of claim 11 wherein said latch members are each pivotable about an axis transverse to the direction of movement of said conveyor and said latch members each include a projection extending transversely of said direction of movement of said conveyor, and wherein said release means at each of said receiving stations includes a release member selectively movable into engagement with said projection on said latch members to selectively pivot said latch members from said first position to said second position as said article supported by said latch member is being displaced by said receiving station by said conveyor.

13. The apparatus of claim 12 wherein each of said release members is selectively movable into the path of movement of said projections so that a selected one of said latch members is pivoted from said first position to said second position as said projection is engaged by said release member by displacement of said conveyor past said release member.

14. The apparatus of claim 13 wherein means for selectively actuating said release means comprises a rotary solenoid for supporting said release member of said release means, each of said rotary solenoids being selectively actuable to rotate its release member into said path of movement of said projections.

15. The apparatus of claim 7 wherein each of said receiving stations include associated transporting means for transporting the articles received thereby away from said conveyor so that the next succeeding article in said predetermined order at said receiving station may be received by said receiving station.

16. The apparatus of claim 15 wherein each of said associated transport means comprises an inclined track member having a portion positioned below said carrier members as said carrier members are displaced past said associated receiving station for receiving said articles released from said carrier members and for moving by gravity along said track member away from said conveyor the articles received by said track member.

17. The apparatus of claim 1 wherein said one portion of said conveyor means includes a plurality of separate sequentially arranged identifiable support positions thereon and support means for supporting said unordered articles at said support positions; and said means for selectively activating including recording means for recording the support position on said conveyor means at which each of said identifiable unordered articles is supported and conveyor position identification means for identifying each support position as it is being displaced by said receiving station to identify said article being displaced by said receiving station by said conveyor means.

18. The apparatus of claim 17 wherein one of said support positions is a reference support position, and wherein each of said means for identifying comprises reference identification means for identifying said reference support position as it is being displaced by said receiving station and counting means for counting the number of support positions relative to said reference support position which are being displaced by said receiving station.

19. The apparatus of claim 18 wherein each of said counting means includes switch means, and switch actuation means associated with each support position for actuating said switch means as each support position is displaced by said receiving station, said conveyor position identification means including means responsive to an actuation of said switch means for maintaining a count of said conveyor positions displaced by each receiving station.

20. The apparatus of claim 19 wherein said conveyor position identification means further includes identity determining means responsive to said counting means and to said recording means for determining the identity of the article being displaced by said receiving station.

21. The apparatus of claim 20 wherein each of said means for selectively activating said release means additionally comprises comparison means responsive to said identity determining means for comparing the identity of the next succeeding article in said predetermined order with the identity of said article determined by said identity determining means, and for generating a release signal if the identities are the same.

22. The apparatus of claim 21 wherein said release means comprises a releasing mechanism responsive to generation of said release signal.

23. The apparatus of claim 22 wherein each of said support means is movable to a release position to release the article supported thereby and wherein each of said release mechanisms comprises a releasing member movable from a rest position to an engaging position in response to generation of said release signal for engaging said supporting means at said support position being displaced by said receiving station to move said support means to said release position.

24. The apparatus of claim 23 wherein each of said release mechanisms returns said releasing member to its rest position after an article has been released.

25. The apparatus of claim 19 wherein each of said switch means comprises a Hall effect switch, and wherein said switch actuating means comprises a vaned member supported on said conveyor means and having a vane associated with said supporting position arranged to actuate said Hall effect switch as said vane moves therepast, said vaned member being supported to position each vane with respect to its associated supporting means so that each of said release means is actuable at the proper time to effect release of one of said articles.

26. The apparatus of claim 25 wherein said reference identification means comprises reference switch means associated with each of said receiving stations and reference switch actuating means associated with said reference support position for actuating each of said reference switch means to reset said response means to begin the count of said support positions passing said receiving station.

27. A method for selectively distributing a plurality of unordered articles in a predetermined order, the method comprising the steps of:
releasably supporting said plurality of unordered articles to be selectively distributed in a sequence on support means;
moving said support means to displace said releasably supported plurality of unordered articles in the sequence received on said support means in a path adjacent to a plurality of receiving stations for receiving a plurality of selectively distributed ones of said plurality of articles in a predetermined order, each of said receiving stations including release means thereat;
identifying at each of said plurality of receiving stations each article being displaced thereby as a function of said article's position in said sequence of unordered articles;
selectively activating in response to said step of identifying said release means at each of said plurality of receiving stations when an article being displaced thereby is to be distributed to that receiving station and is the next succeeding article in such predetermined order to be distributed thereto; and
continuing movement of said support means until all the articles on said support means are released at each of said receiving stations and assembled thereat in said predetermined order.

28. The method of claim 27 further including the step of collecting together said plurality of selectively distributed ones of said plurality of articles received by said plurality of receiving stations in said predetermined orders in a desired order on a collecting apparatus to thereby arrange the articles in an overall order in which the articles are arranged in a plurality of predetermined orders with said predetermined orders of articles being arranged in said desired order.

29. The method of claim 28 wherein the step of collecting comprises directing each of the predetermined orders of articles, one at a time in said desired order, from said receiving stations onto said collecting apparatus.

30. The method of claim 27 wherein said step of selectively activating at each of said receiving stations comprises, determining for each of said receiving stations whether said article being displaced thereby is the next succeeding article in said predetermined order with respect to the articles previously received at that one receiving station; actuating said release means to release said article to that one receiving station if said article is the next succeeding article in said predetermined order, and continuing movement of said article to the next succeeding receiving station in said path if said article is not the next succeeding article in said predetermined order at that one receiving station.

31. The method of claim 27 wherein said step of releasably supporting said randomly arranged articles on support means comprises releasably supporting said articles on an endless conveyor for movement past said receiving stations and wherein said step of moving comprises driving said endless conveyor to displace said articles by said receiving stations.

32. The method of claim 27 wherein said step of releasably supporting said articles comprises releasably supporting said articles at one of a plurality of support positions on said support means in said sequence of unordered articles and recording the identity of each article and the support position at which it is supported in a memory device, and wherein the step of selectively activating at each of said receiving stations includes first identifying each of said support positions for said articles as they are being displaced by said receiving station, determining the identity of the article supported at said support positions in response to said steps of identifying said support positions and said recording in said memory device and then releasing said article if the article is the next succeeding article in said predetermined order.

33. The method of claim 32 further including the step of entering the desired predetermined orders of articles into said memory device.

34. The method of claim 32 wherein said step of recording comprises entering in said memory device in the sequence of unordered articles the identity of said articles.

35. The method of claim 34 wherein said step of releasably supporting said articles at said plurality of support positions on said support means comprises identifying a reference support position on said support means and loading said articles in said sequence of unordered articles beginning with said reference support position.

36. The method of claim 34 wherein the step of recording further includes identifying said support positions relative to said reference support position at which an article is not supported, and adjusting the record of said identities of articles to reflect said empty support positions.

37. The method of claim 36 wherein said step of identifying each of said support positions at each of said receiving stations comprises identifying said reference support position as it passes each of said receiving stations and maintaining a count at each of said receiving stations of the number of support positions passing said receiving station.

38. The method of claim 37 wherein said step of identifying said support positions further includes resetting said count at each of said receiving stations each time said reference position passes said receiving stations.

39. The method of claim 32 wherein said step of selectively activating comprises comparing at each of said receiving stations the identity of the articles supported at said support position being displaced by said receiving station with the identity of the next succeeding article in said predetermined order at said receiving station, and actuating said release means to release said articles if the identities compared are the same.

* * * * *